United States Patent
Kwon (10) Patent No.: US 12,194,546 B2
(45) Date of Patent: Jan. 14, 2025

(54) CUBIC BORON NITRIDE INSERTS, RELATED METHODS, AND RELATED APPARATUS

(71) Applicant: BOARD OF TRUSTEES OF MICHIGAN STATE UNIVERSITY, East Lansing, MI (US)

(72) Inventor: Patrick Kwon, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 646 days.

(21) Appl. No.: 17/476,653

(22) Filed: Sep. 16, 2021

(65) Prior Publication Data
US 2022/0080511 A1 Mar. 17, 2022

Related U.S. Application Data

(60) Provisional application No. 63/078,990, filed on Sep. 16, 2020.

(51) Int. Cl.
*B23B 1/00* (2006.01)
*B23B 27/14* (2006.01)
(Continued)

(52) U.S. Cl.
CPC ............... *B23B 35/00* (2013.01); *B23B 1/00* (2013.01); *B23B 27/148* (2013.01);
(Continued)

(58) Field of Classification Search
CPC ............ B23B 2222/14; B23B 2222/44; B23B 2222/84; B23B 2226/125; B23B 1/00; B23B 35/00
See application file for complete search history.

(56) References Cited

U.S. PATENT DOCUMENTS 8,074,865 B2 12/2011 Yao
8,828,899 B2 9/2014 Persson et al.
(Continued)

FOREIGN PATENT DOCUMENTS

EP 2633930 A1 9/2013
EP 1780186 B1 12/2015
(Continued)

OTHER PUBLICATIONS

Nguyen D. et al., "Formation Mechanism of Alumina Layer in Protecting Cubic Boron Nitride Inserts in Turning Cast Irons," *Int. J. Mach. Tools Manuf.*, 153:1-18 (2020).
(Continued)

*Primary Examiner* — Alan Snyder
(74) *Attorney, Agent, or Firm* — MARSHALL, GERSTEIN & BORUN LLP (57) ABSTRACT

The disclosure relates to cubic boron nitride inserts for machining iron-based workpieces, as well as related methods and apparatuses. The insert includes a cutting element containing cubic boron nitride (cBN) in an amount in a range of 50 wt. % to 95 wt. % based on the cutting element, and a binder containing at least one of (i) alumina ($Al_2O_3$) and a manganese material (e.g., an oxide such as $MnO_x$) and (ii) zirconia ($ZrO_2$). The insert can be used for various machining processes, for example turning or boring. Suitable workpieces include iron-based materials or ferrous alloys, for example a cast iron such as compacted graphite iron (CGI).

20 Claims, 3 Drawing Sheets

(51) Int. Cl.
   *B23B 27/20*      (2006.01)
   *B23B 35/00*      (2006.01)
   *C04B 35/5831*    (2006.01)

(52) U.S. Cl.
   CPC .... *C04B 35/5831* (2013.01); *B23B 2226/125* (2013.01); *B23B 2270/54* (2013.01); *C04B 2235/3217* (2013.01); *C04B 2235/3244* (2013.01); *C04B 2235/5436* (2013.01); *C04B 2235/5445* (2013.01); *C04B 2235/785* (2013.01); *C04B 2235/786* (2013.01)

(56) References Cited

U.S. PATENT DOCUMENTS

| | | |
|---|---|---|
| 9,120,707 B2 | 9/2015 | Matsuda et al. |
| 2010/0204072 A1 | 8/2010 | Kwon et al. |
| 2010/0313489 A1 | 12/2010 | Teramoto et al. |
| 2017/0197885 A1* | 7/2017 | Okamura .......... C04B 35/62685 |

FOREIGN PATENT DOCUMENTS

| | | |
|---|---|---|
| EP | 3466573 A1 | 4/2019 |
| WO | WO-2017/006777 A1 | 1/2017 |

OTHER PUBLICATIONS

Nguyen D. et al., "Layer Formation When Turning FGI and CGI and Their Impact in Machinability," *Int. Symposium on Precision Engineering and Sustainable Manufacturing*, (PRESEM) 2019, Da Nang, Vietnam, Jul. 10, 2019, pp. 1-15.

* cited by examiner

CUBIC BORON NITRIDE INSERTS, RELATED METHODS, AND RELATED APPARATUS

CROSS REFERENCE TO RELATED APPLICATION

Priority is claimed to U.S. Provisional Application No. 63/078,990 filed on Sep. 16, 2020, which is incorporated herein by reference in its entirety.

STATEMENT OF GOVERNMENT INTEREST

None

BACKGROUND OF THE DISCLOSURE

Field of the Disclosure

The disclosure relates to an insert including a cutting element for machining an iron-based workpiece. The cutting element includes cubic boron nitride (cBN) and a binder including at least one of (i) alumina ($Al_2O_3$) and a manganese material, and (ii) zirconia ($ZrO_2$). The disclosure also relates to methods of machining an iron-based workpiece including providing an insert including the cutting element and machining the iron-based workpiece by contacting the workpiece and the cutting element, thereby shaping the workpiece.

Brief Description of Related Technology

Cast irons constitute 70% of the total cast metals, of which flake graphite iron (FGI) or gray cast iron has been extensively used by the automotive industry for engine blocks. In recent years, another family of cast iron called compacted graphite iron (CGI) has gained more attention by many automotive companies. Consequently, implementation of CGI has risen. The advantage of CGI over FGI is its improved mechanical properties, specifically the elastic modulus, which is about 35% higher than that of FGI, as well as the tensile and fatigue strength, which are nearly doubled those of FGI. However, the poor machinability has prevented CGI from being used in a wide range of potential applications.

When machining cast iron and other ferrous alloys at high cutting speeds, inserts including carbon boron nitride (cBN) are often preferred over polycrystalline diamond (PCD), because PCD is thermodynamically unstable against iron. However, improved inserts including cBN inserts for use in machining iron-based workpieces, such as CGI, are needed.

SUMMARY

In one aspect, the disclosure relates to a method for machining an iron-based workpiece, the method comprising providing an insert comprising a cutting element comprising cubic boron nitride (cBN) in an amount in a range of 50 wt. % to 95 wt. % based on the cutting element; and a binder comprising at least one of (i) alumina ($Al_2O_3$) or other aluminum-containing material and a manganese material (e.g., an oxide such as $MnO_x$) and (ii) zirconia ($ZrO_2$) or other zirconium-containing material; and machining an iron-based workpiece (e.g., ferrous alloy) by contacting the workpiece with the cutting element, thereby shaping the workpiece. The cutting element of the insert can generally be in the form of a composite material in which the cBN is present as a particulate phase dispersed throughout a continuous matrix formed by the binder.

The cBN inserts according to the disclosure can be used in a variety of machining processes, for example straight turning or boring. In embodiments, machining the iron-based workpiece comprises performing a turning process using the insert to machine (e.g., shape, cut, etc.) the workpiece with the cutting element of the insert while rotating the workpiece. The workpiece can be rotated at high speeds, for example, at least about 300, 400, 500, 600, 700, or 800 m/min and/or up to about 700, 800, 900, 1000, 1200, or 1400 m/min. In embodiments, the workpiece is rotated at a speed of at least about 1000 m/min. In other embodiments, machining the iron-based workpiece comprises performing a boring process using the insert to machine the workpiece with the cutting element of the insert while rotating the cutting element. The cutting element can be rotated as similar speeds noted above for the workpiece. For example, automotive manufacturers may use boring as each cylinder of an engine or engine block is bored at extremely high speeds.

In another aspect, the disclosure relates to a machining tool insert for machining an iron-based workpiece, for example including an insert with a cutting element with cBN and binder as described herein in any of its various embodiments. In a related aspect, the disclosure relates to a machining system (e.g., a CNC machining system) incorporating the machining tool insert along with suitable mounting and support structure for rotating and/or translating the insert and/or the iron-based workpiece during a machining process. The machining system can likewise incorporate a computer system to control the machining tool insert and/or workpiece during machining.

As used herein, the term "iron-based workpiece" can include a workpiece that is formed from or otherwise includes a ferrous alloy, for example comprising at least about 50, 75, 85, 90, or 95 wt % iron, based on the total weight of the workpiece. Examples of iron-based workpieces can include cast irons or any other ferrous alloy, such as steel. In embodiments, the iron-based workpiece is selected from the group consisting of a steel workpiece and a cast-iron workpiece. The cBN inserts according to the disclosure are particularly useful when a ferrous alloy is cut at extremely high speed. The cBN material in the inserts is the hardest material after polycrystalline diamond (PCD). PCD, however, which is made of carbon, dissolves readily into iron at high cutting temperature typically resulting from high speed cutting, whereas cBN does not dissolve under such conditions.

In embodiments, the iron-based workpiece is selected from the group consisting of a compacted graphite iron (CGI) workpiece, a flake graphite iron (FGI) workpiece, and a nodular graphite iron (NGI) workpiece. Cast irons are generally classified into three main categories based on the graphite morphology. FGI has randomly oriented flakes of graphite, which act as stress risers, while CGI has vermicular or "cloud-like" graphite morphology, which are randomly oriented with substantially more rounded edges. Vermicular graphite forms mechanically stronger interfaces with the iron matrix, which improves fracture toughness and mechanical strength. Nodular graphite iron (NGI), which has a nodular or spheroidal graphite morphology, exhibits even higher mechanical an physical properties with the highest ductility among the three cast irons. In all three cast irons, the matrix includes a ferrite phase and a pearlite phase, which is the lamellar phase alternating between ferrite and cementite ($Fe_3C$). The cementite phase is considered to be the most abundant hard abrasive phase when machining cast irons.

In embodiments, the iron-based workpiece is FGI. Typically, FGI includes about 3.01% carbon, 2.42% silicon, 0.73% manganese, 0.055% sulfur, 0.027% phosphorus, as well as residual amounts for chromium, copper, and/or tin, with the balance being iron. These amounts are provided on a weight basis, and the various ranges thereof are generally known in the art.

In embodiments, the iron-based workpiece is CGI. Typically, CGI includes about 3.55% carbon, 2.22% silicon, 0.39% manganese, 0.007% sulfur, 0.029% chromium, 0.94% copper, 0.081% tin, and 0.006% titanium, with the balance being iron. These amounts are provided on a weight basis, and the various ranges thereof are generally known in the art.

In embodiments, the iron-based workpiece is NGI. Typically, NGI includes about 3.7% carbon, 2.53% silicon, 0.25% manganese, 0.025% sulfur, and 0.05% phosphorus, with the balance being iron. These amounts are provided on a weight basis, and the various ranges thereof are generally known in the art.

As described herein, the cutting element of the insert includes cubic boron nitride (cBN). Cubic boron nitride has a crystal structure analogous to that of diamond, a sphalerite crystal structure, but is much more thermodynamically stable against iron and can be used to machine iron-based workpieces at high speeds. The cBN particles typically have an irregular or quasi-spherical shape, and can have an average particle size in a range of 0.5 or 1 μm to 10 or 20 μm (e.g., at least about 0.5, 1, 2, 3, 5, 10, 12, or 15 μm and/or up to about 5, 7, 10, 12, 15, 17, or 20 μm). In embodiments, the cBN has an average particle size in a range of about 1 μm to 20 μm. The average particle size can represent a weight-, number-, surface area-, or volume-average size a particle size distribution for the cBN particles. The amount of cBN in the cutting element can be in a range of about 50 wt. % to 95 wt. % (e.g., at least about 50, 55, 60, 65, 70, or 75 wt % and/or up to about 65, 70, 75, 80, 85, 90, or 95 wt %) based on the total weight of the cutting element.

The cutting element further includes a binder. The binder comprises at least one of (i) alumina ($Al_2O_3$) and a manganese material (e.g., an oxide such as $MnO_x$), and (ii) zirconia ($ZrO_2$). The binder can be present in an amount of about 5 wt % to about 50 wt % (e.g., at least about 5, 10, 15, 20, 25, or 30 wt % and/or up to about 25, 30, 35, 40, 45 or 50 wt %) based on the total weight of the cutting element. The foregoing ranges can reflect the alumina/manganese or zirconia portion of the binder, or alternatively the total amount of binder (e.g., alumina/manganese or zirconia binder components plus optional ceramic and/or metal filler/binder components).

In embodiments, the binder comprises alumina and a manganese material. The manganese material can include, but is not limited to, elemental manganese, manganese oxides having the generic formula $Mn_xO_y$, such as MnO, $MnO_2$, $Mn_2O_3$, and $Mn_2O_7$; manganese carbonate, manganese chloride, and manganese acetate. The specific form or compound of the manganese material (e.g., oxide, nitride, salt) is not particularly limited, because the manganese is typically dissociated or otherwise liberated as Mn during the machining process (e.g., at high temperatures/high speeds). In some embodiments, the alumina component can more generally be replaced by other aluminum-containing compounds (e.g., aluminum in combination with one or more other metals), for example in the form of an oxide. The total amount of alumina and the manganese material make up at least about 20, 30, 40, 50, 60, 70, 80, 90, 95, or 99.5 wt % of the binder. The amount of alumina in the binder can be in a range of about 5 wt % to about 99.5 wt % (e.g., at least about 5, 10, 20, 25, 30, 40, 50, or 60 wt % and/or up to about 50, 60, 70, 75, 80, 95, or 99.5 wt %) based on the total weight of the binder. The amount of the manganese material in the binder can be in a range of about 0.01 wt % to about 5 wt % (e.g., at least about 0.01, 0.05, 0.1, 0.2, 0.3, 0.4, 0.5, 1, 2, 3, 4 or 5 wt %) based on the total weight of the binder. The ratio of alumina to the manganese material in the binder can be in a range of about 2000:1 to about 99550:1 (e.g., at least about 2000:1, 5000:1, 10000:1, or 20000:1, and/or up to about 5000:1, 10000:1, 20000:1, 40000:1, 75000:1, or 99550:1). Other ingredients, such as fillers (e.g., ceramic fillers) or additional metal materials, can be included in the binder. Each of the alumina, the manganese material, and any additional ingredients can be present in the form of a continuous binder matrix when, for example, the amount of binder in the cutting element is in a range of about 20 or 30 wt % to about 50 wt %, based on the weight of the cutting element. As the amount of binder material in the cutting element decreases, e.g. below about 20 wt % or 30 wt % of the cutting element, the various binder components (i.e., alumina, manganese material, and optional filler), may be present in the form of discrete particles, as opposed to a continuous matrix. For example, when the binder is present in an amount in a range of about 5 wt % to about 20 or 30 wt %, the various components may be present in the form of discrete particles.

In embodiments, the binder comprises zirconia. In some embodiments, the zirconia component can more generally be replaced by other zirconium-containing compounds (e.g., zirconium in combination with one or more other metals), for example in the form of an oxide, nitride, etc. The total amount of zirconia makes up at least about 50, 60, 70, 80, 90, 95, or 99.5 wt % of the binder. Other ingredients, such as fillers (e.g., ceramic fillers) or additional metal materials, can be included in the binder. Each of the zirconia and any additional ingredients can be present in the form of a continuous binder matrix when, for example, the amount of binder in the cutting element is in a range of about 20 or 30 wt % to about 50 wt %, based on the weight of the cutting element. As the amount of binder material in the cutting element decreases, e.g. below about 20 wt % or 30 wt % of the cutting element, the various binder components (i.e., zirconia and optional filler), may be present in the form of discrete particles, as opposed to a continuous matrix. For example, when the binder is present in an amount in a range of about 5 wt % to about 20 or 30 wt %, the various components may be present in the form of discrete particles. In embodiments, the amount of zirconia in the cutting element is at least about 25 wt %, based on the total weight of the cutting element. In embodiments, the binder comprises a combination of zirconia and the manganese material, as described herein, for example with a relative distribution between the zirconia and the manganese material as described above for the alumina and the manganese material.

The binder can further include an additional ceramic and/or metal material (e.g., other than the alumina or zirconia). In embodiments, the binder further comprises at least one of a titanium material, a tungsten material, a cobalt material, a chromium material, a molybdenum material, and a nickel material. The additional metal materials in the binder can include those generally known in the art. For example, the various materials can be included in one or more of a metallic (e.g., elemental or alloy) form, an oxide, a nitride, a carbide, a carbonitride, etc., for example titanium carbide, titanium nitride, or titanium carbonitride.

While the disclosed cBN inserts and methods of the disclosure are susceptible of embodiments in various forms, specific embodiments of the disclosure are illustrated (and will hereafter be described) with the understanding that the disclosure is intended to be illustrative, and is not intended to limit the claims to the specific embodiments descried and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to cubic boron nitride inserts for machining iron-based workpieces, as well as related methods and apparatuses. The insert includes a cutting element containing cubic boron nitride (cBN) in an amount in a range of 50 wt. % to 95 wt. % based on the cutting element, and a binder containing at least one of (i) alumina ($Al_2O_3$) and a manganese material (e.g., an oxide such as $MnO_x$) and (ii) zirconia ($ZrO_2$). The insert can be used for various machining processes, for example turning or boring. Suitable workpieces include iron-based materials or ferrous alloys, for example a cast iron such as compacted graphite iron (CGI). Alumina is a good binder phase offering a few orders of magnitude stability against dissolution wear, one of the main wear mechanisms, and manganese can be added to help form a stable protective layer during the machining process, in particular with a CGI workpiece. Zirconia is a few orders of magnitude more stable than alumina, and zirconia can be used as a binder phase without manganese or other sintering add. For example, iron from a CGI or other iron-based workpiece can serve as a sintering aid to form a stable protective layer such that a sintering aid need not be separately added to the binder phase in the insert.

A machine tool is a powered mechanical device, which may be used to manufacture components such as metal materials (e.g., metal alloy materials), composite materials, wood, or polymers by machining. Machining is the selective removal of material from a substrate or workpiece. A tipped tool or insert is typically used in a turning machining process in which a non-rotating, but linearly translating, cutting tool engages a surface of the workpiece while the workpiece rotates. The cutting edge of an insert can be formed by a cutter tip formed from a different material from that of the rest of the tool or insert, the tip typically being brazed or clamped onto a tool body. A tip for a machine tool may be produced by processing a blank body to form it into a configuration for a tip. A rake face of a cutting tool or insert is the surface or surfaces over which chips flow when the tool is used to remove material from a workpiece, the rake face directing the flow of newly formed chips. Chips are the pieces of a workpiece removed from a work surface of the workpiece by a machine tool in use. A cutting edge of a tip is the edge of a rake face intended to perform cutting of a body. The flank is the tool surface or surfaces over which the surface produced on the workpiece by the cutting tool passes (i.e. the surface on the workpiece from which the chip material flowing over the rake face has been cut).

Without intending to be bound by theory, the inserts of the disclosure are believed to have improved machinability for machining iron-based workpiece due to the formation of an alumina or zirconia layer on the surface of the cutting element during the machining process. The alumina or zinc layer is surprisingly stable and can provide improved dissolution wear during use.

Figure 1:
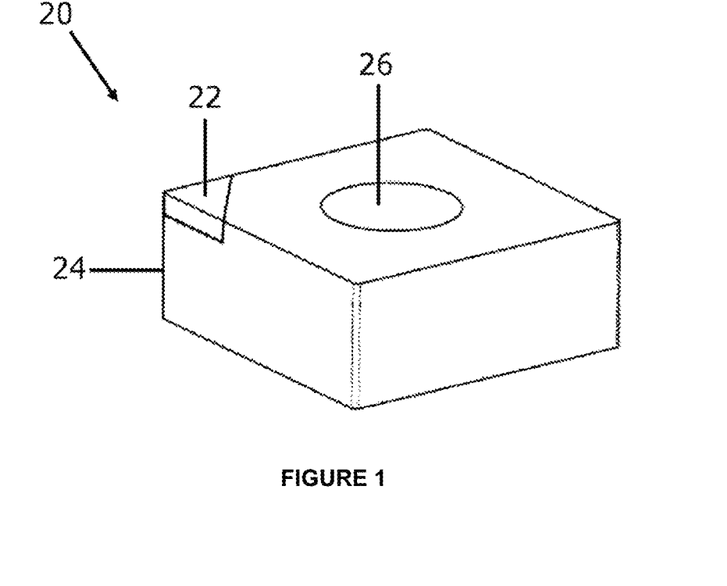
FIG. 1 is a perspective view of an insert including a cutting element according to the disclosure.
Figure 1A:
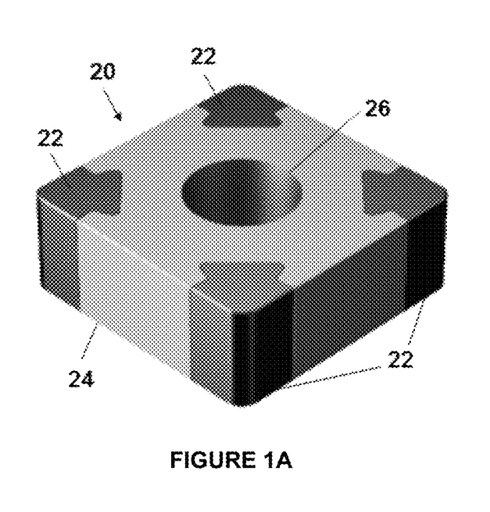
FIG. 1A is a perspective view of an insert including four cutting elements according to the disclosure.
Figure 1B:
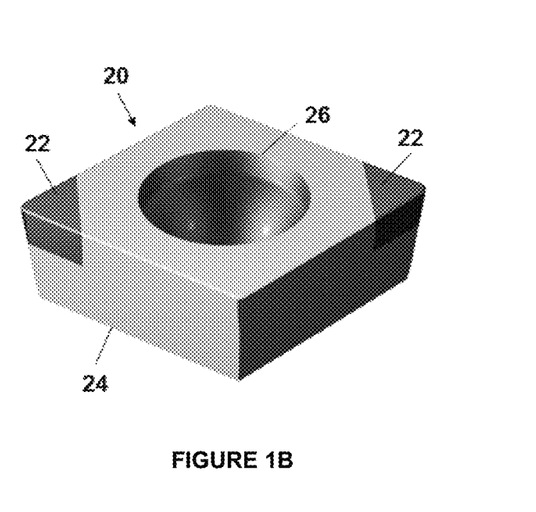
FIG. 1B is a perspective view of an insert including two cutting elements according to the disclosure.

FIG. 1 illustrates an insert 20 according to the disclosure, which can be used in combination with a holder and machine tool (not shown) to machine a workpiece. The insert 20 can include at least one cutter or cutting element or tip 22 joined to a carrier body 24, which may have means 26 (e.g., a hole or other mounting orifice) for mounting the insert 20 onto a machine tool or holder 50. For example, the cutting element or tip 22 can include cubic boron nitride (cBN) and a binder including at least one of (i) alumina ($Al_2O_3$) and a manganese material and (ii) zirconia ($ZrO_2$). The carrier body 24 can include cemented tungsten carbide material and the cutting element 22 may be joined to the carrier body 24 by means of braze material. In other embodiments, the insert 20 can include a plurality of cutting elements 22, for example at two or more corners of the body 24. FIG. 1A illustrates an embodiment in which the insert 20 includes four cutting elements 22 positioned at each corner of a square insert 20, for example where the cutting elements extend along the full height of the carrier body 24. FIG. 1B illustrates an embodiment in which the insert 20 includes two cutting elements 22 positioned at opposing corners of a square insert 20, for example where the cutting elements extend along only a partial height of the carrier body 24.

An example method of making a cutting element 22 material includes blending grains of cubic boron nitride (cBN) into a precursor powder for the binder matrix to form a base powder. The base powder can be mixed with an organic binder (e.g., a polymeric binder) and solvent to form a slurry. The slurry can be dried to produce granules which are shaped to form a green body. The green body can then be sintered to form a sintered body. The sintered body can then be shaped to form the cutting element or tip 22 for use in manufacturing an insert 20 or corresponding machine tool. For example, the sintered body can be cut into smaller pieces having a desired shape by means of laser cutting or electro-discharge machining (EDM), and forming cutting edges onto pieces by grinding. The cutting element or tip 22 can be attached to the carrier body 24 by brazing or clamping to form the insert 20. The insert 20 and corresponding machine tool can then be used to machine an iron-based workpiece according to the disclosure.

Figure 2:
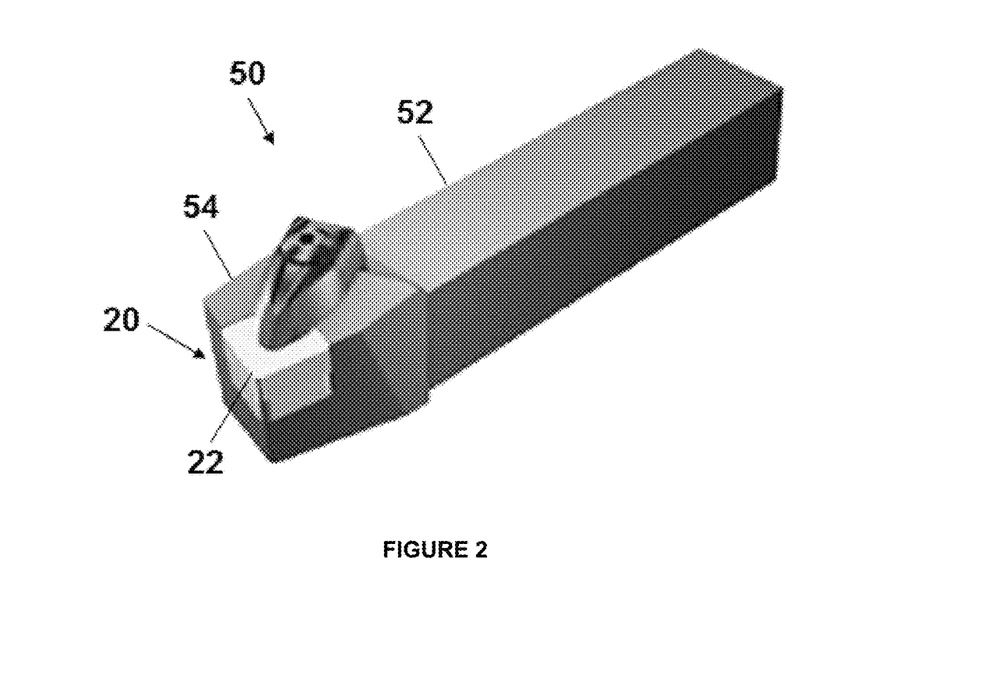
FIG. 2 is a perspective view of a machine tool holder including an insert according to the disclosure.

FIG. 2 illustrates a machine tool holder 50 including an insert 20 according to the disclosure. The tool holder 50 includes a proximal or arm portion 52, for example for attachment of the holder 50 to or as a component of a CNC machining apparatus that can position and orient the holder 50 and insert 20 as desired during a machining process. The tool holder 50 includes a distal portion 54 adapted to attach to or otherwise mount/receive the insert 20 with its cutting element 22 exposed for a machining process. The illustrated holder 50 and insert 20 can be used, for example, in a turning machining process in which the holder 50 is positioned to engage the cutting element 22 of the insert 20 with a workpiece 30 while the workpiece 30 is rotated at high speeds. Other suitable holder configurations can be selected by the skilled artisan based on the desired machining process, for example a holder designed to rotate the insert 20 and cutting element 22 while contacting a (stationary) workpiece 30 during a boring or other machining process.

The cutting element 22 of the insert 20 includes cubic boron nitride (cBN) and a binder. The amount of cBN in the cutting element 22 can be in a range of about 50 wt. % to 95 wt. % based on the total weight of the cutting element. For example, the cutting element 22 can contain cBN in amount of at least about 50, 55, 60, 65, 70, or 75 wt % and/or up to about 65, 70, 75, 80, 85, 90, or 95 wt % based on the total weight of the cutting element. The binder includes at least one of (i) an aluminum-containing material (e.g., alumina ($Al_2O_3$)) and a manganese material (e.g., an oxide such as $MnO_x$), and (ii) a zirconium-containing material (e.g., zirconia ($ZrO_2$)). For example, in some embodiments, the binder includes a mixture of the aluminum-containing material and the manganese material. In other some embodiments, the binder includes the zirconium-containing material. The binder can be present in an amount of about 5 wt % to about 50 wt % based on the total weight of the cutting element. For example, the cutting element 22 can contain the binder in amount of at least about 5, 10, 15, 20, 25, or 30 wt % and/or up to about 25, 30, 35, 40, 45 or 50 wt % based on the total weight of the cutting element. The foregoing ranges can reflect the aluminum-containing component/manganese or zirconium-containing component portion of the binder, or alternatively the total amount of binder, for example including the alumina/manganese or zirconia binder components plus optional ceramic and/or metal filler binder components.

Cubic boron nitride (cBN) has a crystal structure analogous to that of diamond, a sphalerite crystal structure, but is much more thermodynamically stable against iron and can be used to machine iron-based workpieces at high speeds. The cBN inserts are particularly useful when a ferrous alloy is cut at extremely high speed. The cBN material in the inserts is the hardest material after polycrystalline diamond (PCD). PCD, however, which is made of carbon, dissolves readily into iron at high cutting temperature typically resulting from high speed cutting, whereas cBN does not dissolve under such conditions. The cBN particles typically have an irregular or quasi-spherical shape, and can have an average particle size in a range of 0.5 or 1 μm to 10 or 20 μm (e.g., at least about 0.5, 1, 2, 3, 5, 10, 12, or 15 μm and/or up to about 5, 7, 10, 12, 15, 17, or 20 μm). In embodiments, the cBN has an average particle size in a range of about 1 μm to 20 μm. The average particle size can represent a weight-, number-, surface area-, or volume-average size a particle size distribution for the cBN particles. In some embodiments, the foregoing sizes can represent cBN particle sizes in powder form and prior to sintering as described above to form an essentially continuous cBN phase or material in the cutting element 22. In some embodiments with relatively higher amounts of binder and relatively lower amounts of cBN in the cutting element 22, the cutting element 22 can include some discrete regions or particles of cBN, for example distributed throughout the binder component(s).

As described above, in some embodiments, the binder includes a mixture of the aluminum-containing material and the manganese material. The aluminum-containing material can be alumina ($Al_2O_3$), but it more generally can include aluminum alone or in combination with one or more other metals, for example in the form of an oxide, nitride, etc. The manganese material can include, but is not limited to, elemental manganese, manganese oxides having the generic formula $Mn_xO_y$, such as MnO, $MnO_2$, $Mn_2O_3$, and $Mn_2O_7$; manganese carbonate, manganese chloride, and manganese acetate. The specific form or compound of the manganese material (e.g., oxide, nitride, salt) is not particularly limited, because the manganese is typically dissociated or otherwise liberated as Mn during the machining process (e.g., at high temperatures/high speeds). The total amount of the aluminum-containing material and the manganese material make up at least about 20, 30, 40, 50, 60, 70, 80, 90, 95, or 99.5 wt % of the binder. The amount of aluminum-containing material in the binder can be in a range of about 5 wt % to about 99.5 wt %, for example at least about 5, 10, 20, 25, 30, 40, 50, 60, 70, 80, 90, or 95 wt % and/or up to about 50, 60, 70, 75, 80, 95, 98, 99, or 99.5 wt %, based on the total weight of the binder. The amount of the manganese material in the binder can be in a range of about 0.01 wt % to about 5 wt %, for example at least about 0.01, 0.05, 0.1, 0.2, 0.3, 0.4, 0.5, 1, 2 wt. % and/or up to about 0.1, 0.2, 0.5, 1, 2, 3, 4 or 5 wt %, based on the total weight of the binder. The ratio of aluminum-containing material to the manganese material in the binder can be in a range of about 2000:1 to about 99550:1, for example at least about 2000:1, 5000:1, 10000:1, or 20000:1, and/or up to about 5000:1, 10000:1, 20000:1, 40000:1, 75000:1, or 99550:1. Other ingredients, such as fillers (e.g., ceramic fillers) or additional metal materials, can be included in the binder.

Figure 3:
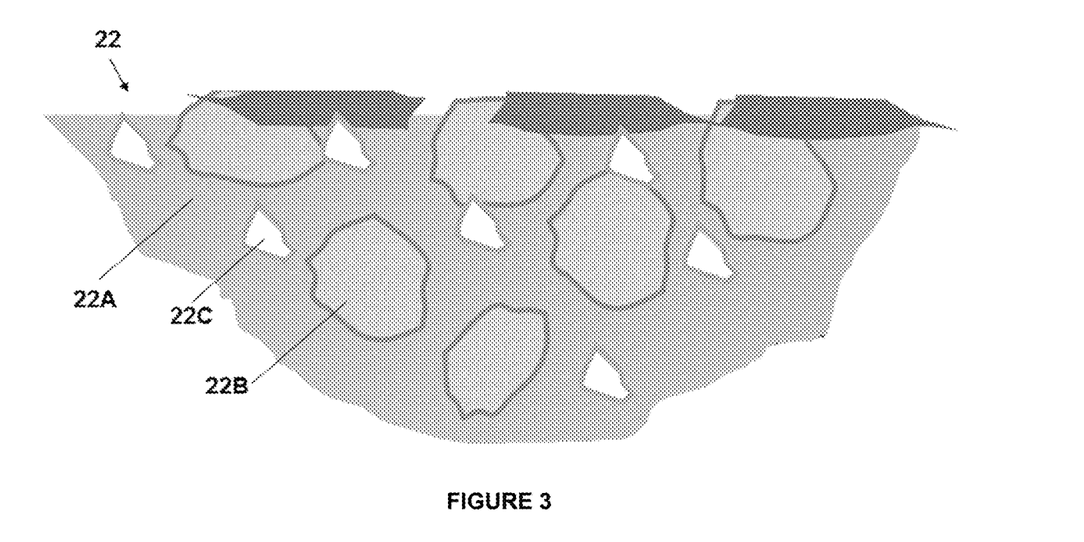
FIG. 3 is a partial side cross-sectional view of a cutting element and corresponding components.

Each of the aluminum-containing material, the manganese material, and any additional ingredients can be present in the form of a continuous binder matrix when, for example, the amount of binder in the cutting element 22 is in a range of about 20 or 30 wt % to about 50 wt %, based on the weight of the cutting element. As the amount of binder material in the cutting element decreases, such as below about 20 wt % or 30 wt % of the cutting element, the various binder components (i.e., aluminum-containing material, manganese material, and optional filler), may be present in the form of discrete particles, as opposed to a continuous matrix. For example, when the binder is present in an amount in a range of about 5 wt % to about 20 or 30 wt %, the various components may be present in the form of discrete particles. FIG. 3 is a partial side cross-sectional view of a cutting element 22 in such an embodiment when the binder components are present as discrete particles. As illustrated, the cutting element 22 includes an essentially continuous cBN phase or material 22A, for example as a result of sintering a powder mixture including cBN particles and binder component particles. The cutting element 22 further includes discrete binder component particles or regions, for example aluminum-containing material particles 22B and manganese material particles 22C distributed throughout the cBN matrix 22A. Although not illustrated, optional binder or filler components can likewise be distributed throughout the cBN matrix 22A as discrete particles.

As described above, in some embodiments, the binder includes a zirconium-containing material. The zirconium-containing material can be zirconia ($ZrO_2$), but it more generally can include other zirconium alone or in combination with one or more other metals, for example in the form of an oxide, nitride, etc. The total amount of zirconium-containing material makes up at least about 50, 60, 70, 80, 90, 95, or 99.5 wt % of the binder. Other ingredients, such as fillers (e.g., ceramic fillers) or additional metal materials, can be included in the binder. In embodiments, the amount of zirconium-containing material in the cutting element is at least about 25 wt %, based on the total weight of the cutting element. In embodiments, the binder can include a combination of the zirconium-containing material and the manganese material, as described herein, for example with a relative distribution between the zirconium-containing material and the manganese material the same as described above for the aluminum-containing material and the manganese material.

Each of the zirconium-containing material and any additional ingredients can be present in the form of a continuous binder matrix when, for example, the amount of binder in the cutting element is in a range of about 20 or 30 wt % to about 50 wt %, based on the weight of the cutting element. As the amount of binder material in the cutting element decreases, e.g. below about 20 wt % or 30 wt % of the cutting element, the various binder components (i.e., zirconium-containing material and optional filler), may be present in the form of discrete particles, as opposed to a continuous matrix. For example, when the binder is present in an amount in a range of about 5 wt % to about 20 or 30 wt %, the various components may be present in the form of discrete particles. This structure of the cutting element 22 is analogous to that described above and illustrated in FIG. 3, for example including a continuous cBN phase or material 22A with zirconium-containing material particles 22B and (optionally) manganese material particles 22C distributed throughout the cBN matrix 22A.

In some embodiments, the binder can further include one or more optional fillers, for example including an additional ceramic and/or metal material other than the aluminum-containing material, zirconium-containing material, and/or manganese material. Examples of other filler materials include titanium materials, tungsten materials, cobalt materials, chromium materials, molybdenum materials, and nickel materials. The additional metal materials in the binder can include those generally known in the art. For example, the various materials can be included in one or more of a metallic (e.g., elemental or alloy) form, an oxide, a nitride, a carbide, a carbonitride, etc. Representative examples for titanium materials include titanium carbide, titanium nitride, and titanium carbonitride. When included, the optional filler material(s) in the binder can be present in a range of about 0.01 wt % to about 35 wt %, for example at least about 0.01, 0.1, 0.5, 1, 2, 5, 7, 10, or 15 wt. % and/or up to about 0.2, 0.6, 2, 4, 8, 12, 20, 25, 30, or 35 wt %, based on the total weight of the binder. The foregoing ranges can apply to optional fillers individually or all optional fillers collectively. In some embodiments, the binder can be free or substantially free of one or more optional fillers, such as including not more than 0.0001, 0.001, 0.01, or 0.1 wt. % of optional fillers collectively or individually. For example, the binder can be free or substantially free of one or more titanium materials, tungsten materials, cobalt materials, chromium materials, molybdenum materials, and/or nickel materials.

The cBN-based inserts 20 according to the disclosure can be used in a variety of processes to machine a workpiece 30, for example a straight turning or boring process. A turning process generally uses the insert 20 to shape, cut, or otherwise machine the workpiece 30 via contact with the cutting element 22 of the insert 20 while rotating the workpiece 30, for example with or without translation of the insert 20 (i.e., but without rotating the insert 20). A boring process generally uses the insert 20 to shape, cut, or otherwise machine the workpiece 30 via contact with the cutting element 22 of the insert 20 while rotating the cutting element 22, for example with or without translation of the workpiece 30 (i.e., but without rotating the workpiece 30). Suitable rotation speeds for the workpiece 30 or cutting element 22 (i.e., depending on the particular type of machining process) can be at least about 300, 400, 500, 600, 700, or 800 m/min and/or up to about 700, 800, 900, 1000, 1200, or 1400 m/min. In embodiments, the workpiece or cutting element is rotated at a speed of at least about 1000 m/min.

Figure 4:
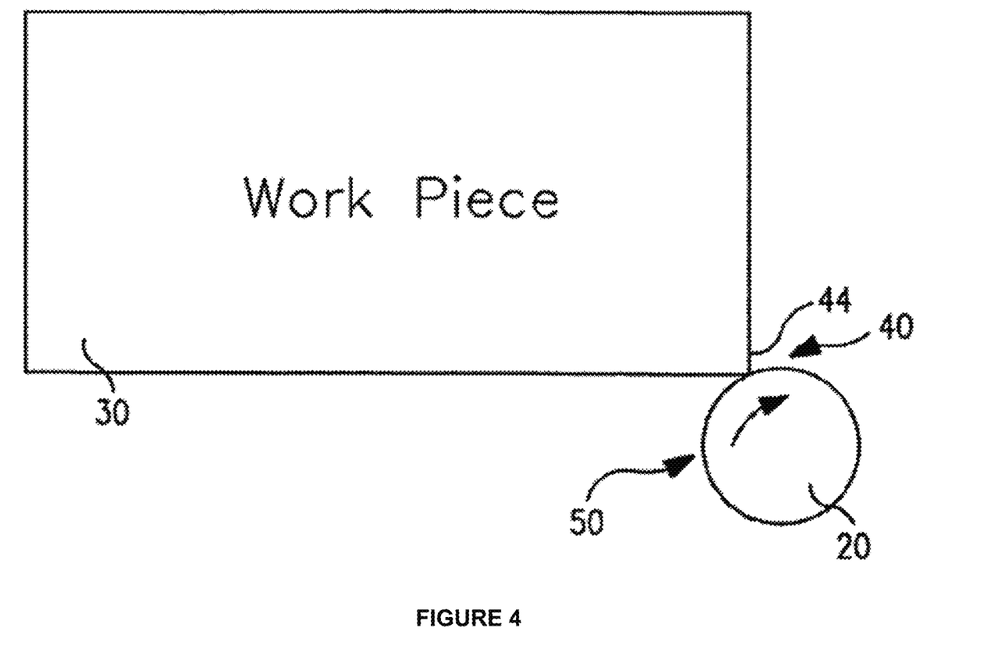
FIG. 4 illustrates a machining process according to the disclosure.

FIG. 4 illustrates a representative process for machining a workpiece 30 using an insert 20 according to the disclosure. In a machining process (e.g., turning, boring, etc.), the tool holder 50 is positioned such that the cutting element of the insert 20 is contacted with the substrate or workpiece 30 to be worked by the tool (e.g., a metal workpiece). The insert 20 and the workpiece 30 are contacted at a worksite 40, which more generally denotes the region where the cutting element (e.g., cutting element 22 as illustrated in FIGS. 1, 1A, 1B, and 2) of the insert 20 and a surface 44 of the workpiece 30 to be worked by the insert 20 are in contact or in close proximity. During operation, typically at least one of the insert 20 and workpiece 30 is rotated to effect the machining step. FIG. 4 qualitatively illustrates a rotating insert 20, which similarly includes a rotating cutting element, for example in a boring process. The tool holder 50 with a corresponding insert 20 can be incorporated into a more general machining system with other conventional components (not shown), for example: (a) a table or other support structure for mounting the substrate or workpiece 30, and (b) an apparatus base or support structure for mounting and moving/rotating the table (i.e., including the workpiece 30), the tool holder 50, and insert 20 in a desired spatial arrangement relative to each other (i.e., whatever is appropriate for the particular machining process to be implemented). During operation, the insert 20 and the workpiece 30 are moved relative to each other to complete the machining process, for example with one or both moving or translating relative to the fixed apparatus base, with one or both rotating relative to each other, etc. For example, the machining system can include a conventional computer numerical control (CNC) machining tool (e.g., lathe, drill, mill, etc. with corresponding mounting, support, and rotation/translation components) incorporating a holder 50 and an insert 20 mounted therein, associated computer system (e.g., software and/or hardware) for controlling the CNC tool with the insert 20 to machine a desired workpiece 30.

The cBN-based insert 20 according to the disclosure is particularly suitable when used to machine an iron-based workpiece 30. The iron-based workpiece 30 is generally formed from or otherwise includes a ferrous alloy, for example a material containing at least about 50, 75, 85, 90, or 95 wt % iron, based on the total weight of the workpiece. Example materials suitable as iron-based workpieces to be machined by the disclosed apparatus and methods include cast irons or any other ferrous alloy, such as steel.

Figure 5:
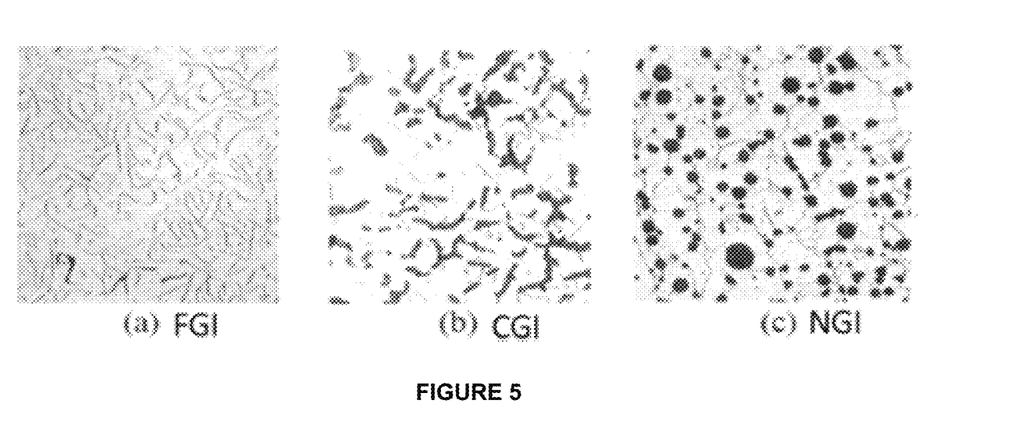
FIG. 5 includes microscope images illustrating the morphology of (a) flake graphite iron (FGI), (b) compacted graphite iron (CGI), and (c) nodular graphite iron (NGI).

Cast irons are generally classified into three main categories based on the graphite morphology: flake graphite iron (FGI), compacted graphite iron (CGI), and nodular graphite iron (NGI). FIG. 5 includes images illustrating the morphology of (a) FGI, (b) CGI, and (c) NGI. As illustrated, FGI has randomly oriented flakes of graphite, which act as stress risers, while CGI has vermicular or "cloud-like" graphite morphology, which are randomly oriented with substantially more rounded edges. Vermicular graphite forms mechanically stronger interfaces with the iron matrix, which improves fracture toughness and mechanical strength.

Nodular graphite iron (NGI), which has a nodular or spheroidal graphite morphology, exhibits even higher mechanical an physical properties with the highest ductility among the three cast irons. In all three cast irons, the matrix includes a ferrite phase and a pearlite phase, which is the lamellar phase alternating between ferrite and cementite ($Fe_3C$). The cementite phase is considered to be the most abundant hard abrasive phase when machining cast irons.

In various embodiments, the iron-based workpiece 30 can be an FGI workpiece, a CGI workpiece, or an NGI workpiece. Typically, FGI includes about 3.01% carbon, 2.42% silicon, 0.73% manganese, 0.055% sulfur, 0.027% phosphorus, as well as residual amounts for chromium, copper, and/or tin, with the balance being iron. Typically, CGI includes about 3.55% carbon, 2.22% silicon, 0.39% manganese, 0.007% sulfur, 0.029% chromium, 0.94% copper, 0.081% tin, and 0.006% titanium, with the balance being iron. Typically, NGI includes about 3.7% carbon, 2.53% silicon, 0.25% manganese, 0.025% sulfur, and 0.05% phosphorus, with the balance being iron. For the various cast irons, the foregoing amounts are provided on a weight basis, and typical ranges resulting from variations in source materials, fabrication methods, etc. are generally known in the art. For example, in some embodiments, a given cast iron sample can have component amount generally within a tolerance of +/−1, 2, 5, 7, 10, 12, 15, 20, or 30% for one or more of the stated components. As an illustration, a given sample of CGI containing about 3.55% carbon with a tolerance of +/−5% can contain carbon in an amount ranging from 3.37 wt. % to 3.73 wt. % relative to the CGI material as a whole. Table 1 below provide some representative physical properties of FGI, CGI, and NGI materials.

TABLE 1

Physical Properties of Representative Cast Irons

| Property | FGI | CGI | NGI |
| --- | --- | --- | --- |
| Tensile strength (MPa) | 250 | 452 | 750 |
| Elastic modulus (GPa) | 105 | 145 | 160 |
| Elongation (%) | 0 | 1.5 | 5 |
| Thermal conductivity (W/(m · K)) | 48 | 37 | 28 |
| Hardness (BHN 10/3000) | 179-202 | 217-241 | 217-255 |
| R-B fatigue (250 MPa) | 110 | 200 | 250 |

Because other modifications and changes varied to fit particular operating requirements and environments will be apparent to those skilled in the art, the disclosure is not considered limited to the example(s) chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In the case of conflict, the present description, including definitions, will control.

Throughout the specification, where the compounds, compositions, methods, and/or processes are described as including components, steps, or materials, it is contemplated that the compounds, compositions, methods, and/or processes can also comprise, consist essentially of, or consist of any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for machining an iron-based workpiece, the method comprising:
   providing an insert comprising a cutting element comprising:
      cubic boron nitride (cBN) in an amount in a range of 50 wt. % to 95 wt. % based on the cutting element; and
      a binder comprising at least one of (i) alumina ($Al_2O_3$) and a manganese material and (ii) zirconia ($ZrO_2$), provided that, when the binder comprises the zirconia, the binder is free from alumina; and
   machining an iron-based workpiece by contacting the workpiece with the cutting element, thereby shaping the workpiece.

2. The method of claim 1, wherein the cBN has an average particle size in a range of 0.5 μm to 20 μm.

3. The method of claim 1, wherein the binder comprises the alumina and the manganese material.

4. The method of claim 3, wherein the total amount of the alumina and the manganese material is in a range of about 5 wt % to about 50 wt %, based on the cutting element.

5. The method of claim 1, wherein the binder comprises the zirconia.

6. The method of claim 5, wherein the total amount of the zirconia is in a range of about 5 wt % to about 50 wt %, based on the cutting element.

7. The method of claim 1, wherein the binder further comprises at least one of a titanium material, a tungsten material, a cobalt material, a chromium material, a molybdenum material, and a nickel material.

8. The method of claim 1, wherein the iron-based workpiece is selected from the group consisting of a steel workpiece and a cast-iron workpiece.

9. The method of claim 1, wherein the iron-based workpiece is selected from the group consisting of a compacted graphite iron (CGI) workpiece, a flake graphite iron (FGI) workpiece, and a nodular graphite iron (NGI) workpiece.

10. The method of claim 1, wherein the iron-based workpiece comprises of a compacted graphite iron (CGI) material.

11. The method of claim 1, wherein machining the iron-based workpiece comprises performing a turning process using the insert to machine the workpiece with the cutting element of the insert while rotating the workpiece.

12. The method of claim 1, wherein machining the iron-based workpiece comprises performing a boring process using the insert to machine the workpiece with the cutting element of the insert while rotating the cutting element.

13. The method of claim 1, wherein:
   the binder is present in an amount in a range of 5 wt. % to 50 wt. % based on the cutting element; and
   the cBN has an average particle size in a range of 0.5 μm to 20 μm.

14. The method of claim 13, wherein:
   the binder comprises the alumina and the manganese material;
   the alumina is present in an amount in a range of 5 wt. % to 99.5 wt. % based on the binder; and the manganese material is present in an amount in a range of 0.01 wt. % to 5 wt. % based on the binder.

15. The method of claim 13, wherein the binder comprises the zirconia.

16. The method of claim 13, wherein:
the cBN is present in an amount in a range of 70 wt. % to 95 wt. % based on the cutting element;
the binder is present in an amount in a range of 5 wt. % to 30 wt. % based on the cutting element; and
the binder comprises discrete particles of its components.

17. The method of claim 13, wherein:
the cBN is present in an amount in a range of 50 wt. % to 70 wt. % based on the cutting element;
the binder is present in an amount in a range of 30 wt. % to 50 wt. % based on the cutting element; and
the binder is in the form of a continuous matrix, and particles of the cBN are distributed throughout the continuous matrix.

18. The method of claim 13, wherein the binder is free from titanium materials, tungsten materials, cobalt materials, chromium materials, molybdenum materials, and nickel materials.

19. The method of claim 13, wherein:
the iron-based workpiece comprises of a compacted graphite iron (CGI) material; and
machining the iron-based workpiece comprises at least one of (i) performing a turning process using the insert to machine the workpiece with the cutting element of the insert while rotating the workpiece, and (ii) performing a boring process using the insert to machine the workpiece with the cutting element of the insert while rotating the cutting element.

20. A method for machining an iron-based workpiece, the method comprising:
providing an insert comprising a cutting element comprising:
cubic boron nitride (cBN) in an amount in a range of 50 wt. % to 95 wt. % based on the cutting element the cBN having an average particle size in a range of 0.5 µm to 20 µm; and
a binder present in an amount in a range of 5 wt. % to 50 wt. % based on the cutting element, the binder comprising alumina ($Al_2O_3$) and a manganese material;
wherein:
the alumina is present in an amount in a range of 5 wt. % to 99.5 wt. % based on the binder;
the manganese material is present in an amount in a range of 0.01 wt. % to 5 wt. % based on the binder;
a combined amount of the alumina and the manganese material is at least 99.5 wt. % of the binder;
the manganese material comprises at least one of elemental manganese, manganese oxides, manganese nitrides, and manganese salts; and
a weight ratio of alumina:manganese material in the binder is in a range of 2000:1 to 99550:1; and
machining an iron-based workpiece by contacting the workpiece with the cutting element, thereby shaping the workpiece.

* * * * *